United States Patent
Chesnokov

(10) Patent No.: US 10,839,495 B2
(45) Date of Patent: Nov. 17, 2020

(54) COMPUTING DEVICES AND METHODS OF IMAGE PROCESSING WITH INPUT IMAGE DATA AND REFERENCE TONE MAPPING STRENGTH DATA

(71) Applicant: Apical Ltd, Cambridge (GB)

(72) Inventor: Viacheslav Chesnokov, Loughborough (GB)

(73) Assignee: Apical Limited, Cambridge (GB)

( * ) Notice: Subject to any disclaimer, the term of this patent is extended or adjusted under 35 U.S.C. 154(b) by 197 days.

(21) Appl. No.: 15/717,430

(22) Filed: Sep. 27, 2017

(65) Prior Publication Data

US 2018/0096467 A1 Apr. 5, 2018

(30) Foreign Application Priority Data

Sep. 30, 2016 (GB) .................................. 1616721.5

(51) Int. Cl.
  *G06T 5/00* (2006.01)
  *G06T 5/50* (2006.01)
(52) U.S. Cl.
  CPC ............... *G06T 5/009* (2013.01); *G06T 5/50* (2013.01); *G06T 2207/10024* (2013.01); *G06T 2207/20208* (2013.01)
(58) Field of Classification Search
  None
  See application file for complete search history.

(56) References Cited

U.S. PATENT DOCUMENTS

| 2011/0249893 | A1* | 10/2011 | Bamidele | H04N 1/6052 382/165 |
| 2013/0294689 | A1* | 11/2013 | Jia | H04N 19/169 382/166 |
| 2016/0005349 | A1* | 1/2016 | Atkins | H04N 5/20 345/591 |
| 2017/0302840 | A1* | 10/2017 | Hasinoff | H04N 1/2137 |

OTHER PUBLICATIONS

Wikipedia, 2016, "Tone mapping", wikipedia.com, available from: https:// en. wikipedia. org/wiki/Tone mapping [accessed: Mar. 14, 2017]. See Sep. 11, 2016 version.
Search Report dated Mar. 27, 2017 on related United Kingdom Application GB1616721.5 filed Sep. 30, 2016.

* cited by examiner

*Primary Examiner* — Kevin Ky
(74) *Attorney, Agent, or Firm* — EIP US LLP

(57) ABSTRACT

A method is provided. The method includes receiving at least part of an input image file. The at least part of the input image file includes input image data representing an image and reference tone mapping strength data representing a reference tone mapping strength parameter for deriving an input value representing an amount of spatially-variant tone mapping. The method further includes inputting the input image data and the input value to a tone mapping operation. The tone mapping operation is applied to the input image data to generate output image data representing an output image with the amount of spatially-variant tone mapping applied. A computing device is also provided.

20 Claims, 6 Drawing Sheets

---

Receiving at least part of an input image file, the at least part of the input image file comprising: input image representing an image; and reference tone mapping strength data representing a reference tone mapping strength parameter for deriving an input value representing an amount of spatially-variant tone mapping

↓

Inputting the input image data and the input value to a tone mapping operation

↓

Applying the tone mapping operation to the input image data to generate output image data representing an output image with the amount of spatially-variant tone mapping applied

COMPUTING DEVICES AND METHODS OF IMAGE PROCESSING WITH INPUT IMAGE DATA AND REFERENCE TONE MAPPING STRENGTH DATA

CROSS-REFERENCE TO RELATED APPLICATIONS

This application claims priority under 35 U.S.C. § 119(a) and 37 CFR § 1.55 to United Kingdom Application No. GB 1616721.5, filed Sep. 30, 2016. The entire contents of the above-referenced patent application are hereby incorporated by reference.

BACKGROUND

Field of the Disclosure

The present disclosure relates to a method and a computing device for processing an image.

SUMMARY

A first aspect provides a method including receiving at least part of an input image file, the at least part of the input image file including input image data representing an image, and reference tone mapping strength data representing a reference tone mapping strength parameter for deriving an input value representing an amount of spatially-variant tone mapping. The method includes inputting the input image data and the input value to a tone mapping operation. The method includes applying the tone mapping operation to the input image data to generate output image data representing an output image with the amount of spatially-variant tone mapping applied.

A second aspect provides a computing device including storage for storing at least part of an input image file, the at least part of the input image file including input image data representing an image, and reference tone mapping strength data representing a reference tone mapping strength parameter for deriving an input value representing an amount of spatially-variant tone mapping. The computing device includes at least one processor communicatively coupled to the storage. The computing device includes a tone mapping module configured to receive the input image data and the input value, and apply the tone mapping operation to the input image data to generate output image data representing an output image with the amount of spatially-variant tone mapping applied.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Dynamic range is typically understood to refer to the ratio between intensities of the brightest and darkest parts of an image or scene. An image that ranges from bright sunlight to deep shadows is generally considered to have a high dynamic range, whereas indoor scenes with lower contrast tend to have a lower dynamic range.

It is known to adjust the dynamic range of an image to enhance the quality of an image using so-called "tone mapping". For example, tone mapping can be used to enhance the level of detail visible in the image while still preserving the natural look of the image. This allows the appearance of a high dynamic range image to be approximated with a lower dynamic range for example.

In a known method, a luminance of a display device and an amount of dynamic range compression applied to display data representing an image are both controlled in dependence on an ambient light level. This can maintain a constant effective dynamic range across a wide range of ambient light conditions, providing a satisfactory viewing experience of the image in a variety of different viewing environments.

It is desirable to provide a method of processing an image that allows for more flexibility, for example more flexibility in the amount of tone mapping applied to the image.

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of processing an image, which may for example be implemented using a computing device. The image may be the entire or whole image or a portion, part or subset of a larger image. The image is for example an image from a web page accessed by a browser of the computing device, such as a browser of a smartphone; an image captured by an image capture device, such as a camera, of the computing device; or an image downloaded to or stored in storage of the computing device. The image may include any graphical or visual content, for example text, graphics, pictures, and/or photographs.

Figure 1:
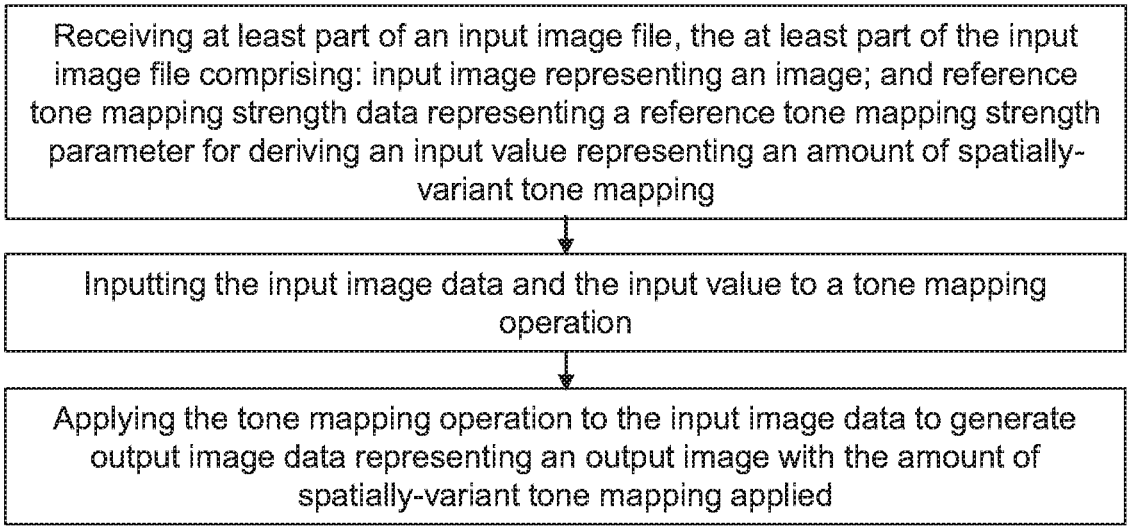
FIG. 1 is a flow diagram illustrating a method according to examples.

FIG. 1 is a flow diagram illustrating the method of processing the image according to examples. The method of FIG. 1 includes receiving at least part of an input image file.

The input image file may be in any suitable format for representing images. Common formats include the JPEG (Joint Photographic Experts Group, ISO/IEC 10918) format or the JPEG XT (ISO/IEC 18477) format.

The at least part of the input image file includes input image data. The input image data may include the intensity values of each pixel of the image, which may be stored with a greyscale or brightness level of, for example, from 0 to 255 per color band for 8-bit data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The input image data may also include color data, relating to the color of the image represented by the input image data. For example, when the image is a color image, a pixel value of an intensity or brightness or each pixel may be stored separately for each color channel. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color. As will be appreciated by the skilled person, the input image data may represent the image using any suitable representation, which may be different from the examples set out above, which are merely illustrative.

The at least part of the input image file also includes reference tone mapping strength data representing a reference tone mapping strength parameter for deriving an input value representing an amount of spatially-variant tone mapping. The input value may be equal to the reference tone mapping strength parameter, allowing the input value to be derived trivially from the reference tone mapping strength parameter. Alternatively, the reference tone mapping strength parameter may be processed, altered or adjusted, either on its own or with additional data, to derive the input value. Examples of deriving the input value are described in more detail below.

The reference tone mapping strength data may be metadata associated with the input image data. For example, where the input image file is in the form of a JPEG, the reference tone mapping strength data may be stored in the Exchangeable Image File Format (EXIF). The EXIF data may be embedded within the input image file itself, for example within the JPEG file. Typically, EXIF data is stored in a header of the JPEG. For example, EXIF data may be stored in one of the utility Application Segments of the JPEG, generally the APP1 (segment marker 0xFFE1), although other segments may be used.

The method in the example of FIG. 1 includes inputting the input image data and the input value to a tone mapping operation and applying the tone mapping operation to the input image data to generate output image data representing an output image with the amount of spatially-variant tone mapping applied. A suitable algorithm for the tone mapping operation is the Orthogonal Retina-Morphic Image Transform (ORMIT) algorithm, although various other, different, tone mapping algorithms are also suitable.

The tone mapping applied to the input image data in examples aims to enhance detail or contrast in the image, while still ensuring the image appears relatively "natural" to an observer. To do this, the tone mapping may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. In the example of FIG. 1, the tone mapping is therefore spatially-variant, for example spatially non-uniform, with a greater amount of tone mapping applied to certain spatial regions of the image compared with other spatial regions. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The tone mapping may therefore involve adjusting the dynamic range of the image, which in examples is the ratio between intensities of the brightest and darkest parts of the image. Adjusting the dynamic range in this way typically enhances detail in dark and/or light areas of the image and reduces detail in mid-tone areas so as to render visible detail that would otherwise be lost in bright or shaded areas of the image while still maintaining a natural look of the image to the observer. The amount of spatially-variant tone mapping in examples corresponds with the extent or magnitude of alteration of the intensity value of pixels in the image by the tone mapping operation, for example to enhance the image detail as explained above.

The dynamic range may be compressed or expanded by the tone mapping operation. Dynamic range compression can be used to reduce the dynamic range of the image to match or be closer to a dynamic range displayable by a display device coupled to the computing device, for example. Images captured using a camera can have a high dynamic range of, for example, up to around 4000:1. In contrast, the dynamic range of typical display devices may be much lower than this, for example around 50:1. Dynamic range compression can therefore be applied to reduce a dynamic range of input image data representing a high dynamic range image to match a lower dynamic range of a display device for displaying the image.

Conversely, dynamic range expansion can be used to increase a dynamic range of the image, for example in cases where the dynamic range displayable by the display device is larger than a dynamic range of the second decoded image data.

By receiving the at least part of the input image file including both the input image data representing the image and the reference tone mapping strength data, the method in examples allows the output image data to be generated based on the input image data and the input value derived from the reference tone mapping strength data. The output image data in such examples can therefore be generated from data contained within the at least part of the input image file itself. This allows the tone mapping operation, and hence the visual impression, of an image to be reproduced at different times, for example in different viewing conditions, or by different computing devices, based on the at least part of the input image file.

The method of examples herein is different and counterintuitive compared to a known method in which a luminance of a display device is adjusted and a dynamic range of display data are compressed in dependence on an ambient light level. With the known method, the image displayed will have a different effective dynamic range depending on the ambient light level. Thus, a first viewer viewing the image on a first display device in dark conditions will observe the image with a different effective dynamic range than a second viewer viewing the image on a second display device in light conditions. This can be beneficial, as it may allow detail in the image to be seen in various different lighting conditions. However, there may be some cases in which it is desired to view an image multiple times on the same device or on different devices in different viewing conditions with the same tone mapping applied, for example such that the image has the same, e.g. a constant, dynamic range, independent of viewing conditions for example. The method according to examples described herein provides this flexibility, as the data needed to derive the input value for the tone mapping operation can be derived from the input tone mapping strength data, which is part of the same input image file as the input image data.

The method according to examples also provides additional flexibility compared with the known method. As the reference tone mapping strength data is provided along with the input image data, further processing or adjustment based on the reference tone mapping strength data can be performed before applying the tone mapping operation to the input image data. For example, if needed, the input value can be derived depending on other, time-varying input, to allow the amount of tone mapping applied by the tone mapping operation to be adjusted appropriately. This can further enhance the image quality of the output image, for example by further highlighting or drawing out detail in dark regions of the output image data representing the output image, while also allowing an exact replica of the image as adjusted based on the tone mapping strength parameter to be produced if required.

Thus, the method according to examples both allows an exact replica of the image to be produced, with the same tone mapping as a previously displayed version of the image, and an enhanced version of the image to be produced, with adjusted tone mapping compared with the previously displayed version of the image.

To put the method into context, an example system with which the method according to examples in accordance with FIG. 1 may be used will be described with reference to FIG. 2 As the skilled person will appreciate, however, other systems or apparatus may be used with or to implement the method. FIG. 3 illustrates a sequence diagram showing an example of communications between the one or more databases, the server device, the computing device and the display device of FIG. 2. Further details of the method according to examples are given subsequently, especially with reference to FIG. 4.

Figure 2:
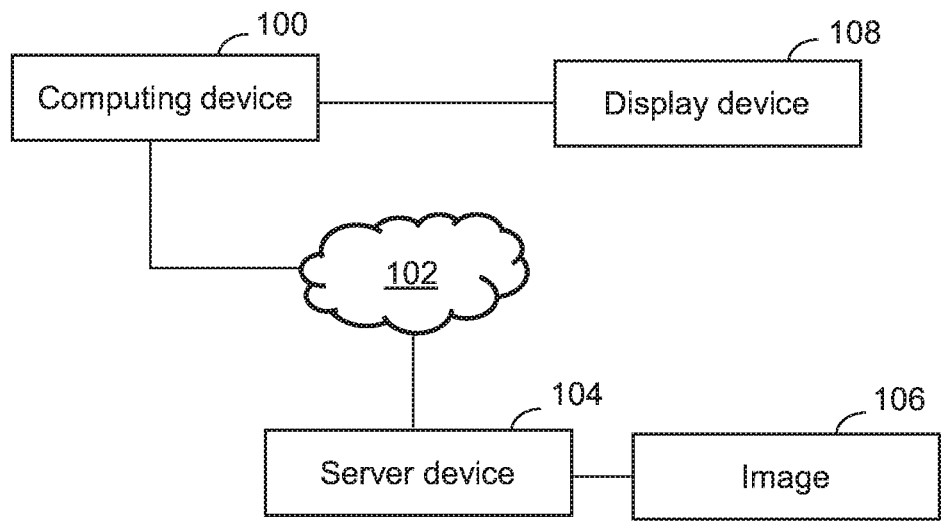
FIG. 2 is a schematic diagram showing an illustrative overview of an example system for use with a method according to examples, such as the method of FIG. 1.
Figure 3:
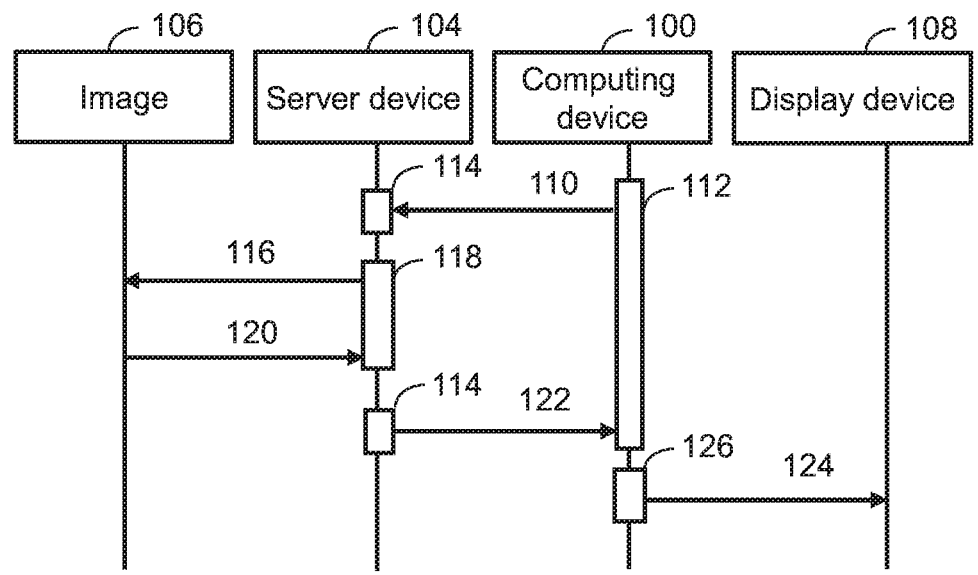
FIG. 3 is a sequence diagram showing an example of communications between the one or more databases, the server device, the computing device and the display device of FIG. 2.

FIG. 2 shows a computing device 100 communicatively coupled to a server device 104 over a network 102. An image 106 is stored on the server device 104. The computing device 100 is communicatively coupled to a display device 108. The network 102 may comprise a series of networks such as the Internet.

The computing device 100 may be or include, amongst others, a cell phone, i.e. a mobile phone, for example a smartphone, a tablet, laptop or personal computer, a personal digital assistant, as well as various other electronic devices such as a game console. The components of an example computing device 100 are described in detail below with reference to FIG. 8. The computing device 100 may have integrated or externally-coupled wired and/or wireless local area network (LAN) capabilities, e.g. which may be coupled via an additional Universal Serial Bus (USB) or proprietary device. For example, the computing device 100 may be couplable to a wired and/or wireless router that is in turn connected to a Digital Subscriber Line (DSL), cable or fiber connection to a local exchange. The local exchange may be coupled to the so-called Internet using one or more intermediate networks, such as a Public Switched Telephone Network (PSTN) or a cable provider's network system. Alternatively, wireless telecommunications systems such as those using the Universal Mobile Telecommunications System (UMTS) or any of the Long Term Evolution (LTE) standards may provide a communications medium for fixed or mobile computing devices. These latter network systems may in turn be connected to a series of one or more networks comprising servers, routers and other networking equipment that communicate using protocols such as Transmission Control Protocol (TCP) and Internet Protocol (IP). If the computing device 100 is a mobile device such as a smartphone, the computing device 100 may have an integrated telecommunications module for wirelessly communicating with a core network coupled to one or more TCP/IP networks; likewise, if the computing device 100 is a laptop or tablet computer it may have an externally-coupled telecommunications modem (a so-called "dongle", typically coupled via USB) for wireless communication with the core network and the wider Internet. The server device 104 may likewise have appropriate network communication components. The server device 104 may include an HTTP server that is arranged to receive requests over the network 102. In certain cases, one or more of the computing device 100 and the server device 104 may comprise virtual devices implemented on underlying physical computing hardware. The computing device 100 in examples may be considered to be a client device configured with access to the server device 104.

In an illustrative example of a possible use of the method according to examples, a user accesses a web page using a browser of the computing device 100. The web page is hosted on the server device 104 and includes various content including an image 106. The image is stored in an input image file. The browser retrieves at least part of the input image file from the server device 104 via the network 102. For example, the server device 104 may be arranged to receive and handle HTTP or other network requests. In this example, the input image file includes the input image data and the reference tone mapping strength data described above. The browser in the example of FIG. 2 retrieves the entire input image file, although in other examples, the browser may receive solely the input image data and the reference tone mapping strength data, without receiving other data of the input image file. For example, the input image file may include additional data, such as metadata relating to or encoding a date and time associated with the image, a description of the image or copyright information relating to the image, which may not be retrieved by the browser.

The computing device 100 in the example of FIG. 2 includes a tone mapping module configured to receive the input image data and the input value and apply the tone mapping operation to the input image data to generate the output image data representing the output image with the amount of spatially-variant tone mapping applied. The input value is derived from the reference tone mapping strength parameter represented by the reference tone mapping strength data, and represents the amount of spatially-variant tone mapping as noted above with reference to FIG. 1. Further details of the tone mapping operation are provided with reference to FIG. 4.

The output image, or a further output image based on an output of additional processing of the output image, may be displayed by the display device 108 coupled to the computing device 100. The display device 108 may be internally coupled to the computing device 100, with the display device 108 forming part of the computing device 100 itself. For example, the display device 108 may be a display screen of a computing device 100 such as a smartphone; tablet, laptop or desktop computer; or personal digital assistant. Alternatively, the display device 108 may be an external device coupled to the computing device 100, for example a television screen or a computer monitor coupled to a laptop, desktop computer or game console via a High-Definition Multimedia Interface (HDMI) cable.

FIG. 3 is a sequence diagram showing an example set of communications between the storage of the server device storing the image 106, the server device 104, the computing device 100 and the display device 108 of FIG. 2.

In operation 110, a browser of the computing device 100 requests a web page including an image 106 from the server device 104 via a network interface 112 of the computing device 100. The request is received by a network interface 114 of the server device 104. In operation 116 of the example communications of FIG. 3, a storage interface 118 of the server device 104 accesses, from storage of or coupled to the server device 104, at least part of an input image file. The at least part of the input image file includes the input image data representing the image and the reference tone mapping strength data representing the reference tone mapping strength parameter for deriving the input value representing the amount of spatially-variant tone mapping. The web page, including the at least part of the input image file, is transmitted from the storage to the storage interface 118 of the server device 104 in operation 120. The server device 104 then transmits the at least part of the input image file from the network interface 114 of the server device 104 to the network interface 112 of the computing device 100 in block 122. A tone mapping module of the computing device, described further with reference to FIGS. 4 to 7, applies a tone mapping operation to generate output image data. In block 124, the output image data is transferred by a display device interface 126 of the computing device 100 to a display device 108 to display an output image based on the output image data, as well as other content of the web page, to the user.

Figure 4:
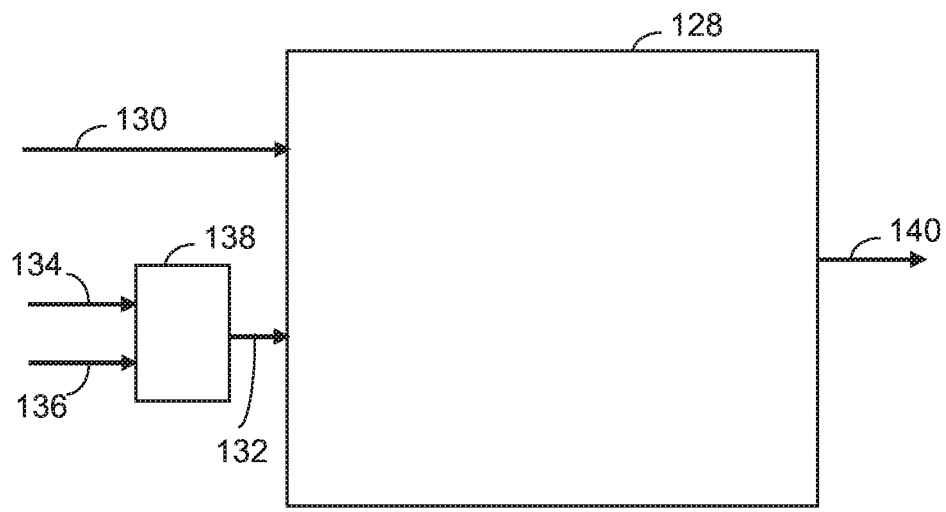
FIG. 4 is a schematic diagram showing a tone mapping module according to an example.

FIG. 4 illustrates schematically an example of a tone mapping module 128 for use in carrying out the method according to examples, such as the method described with reference to FIG. 1. The tone mapping module 128 receives as inputs input image data 130 and an input value 132. The input image data 130 represents an image, as described above. The input value 132 is derived from the reference tone mapping data representing the reference tone mapping strength parameter.

FIG. 4 shows an example of the derivation of the input value 132. In FIG. 4, the reference tone mapping strength data 134 and further reference tone mapping strength data 136 representing a further tone mapping strength parameter are received by an input value derivation module 138. The input value derivation module 138 derives the input value 132 by combining the reference tone mapping strength data 134 and the further tone mapping strength data 136 to generate combined tone mapping strength data. The input value 132 is equal to the combined tone mapping strength data in this example.

In examples such as FIG. 4, the reference tone mapping strength data 134 and the further reference tone mapping strength data 136 may depend on different parameters or properties. For example, the reference tone mapping strength data 134 may depend on at least one of: a pre-determined value; a display property of a display device configured to display an output image based on the output image data; an ambient light level; or an application property of an application for use in displaying the output image based on the output image data. The further reference tone mapping strength data 136 may depend on at least one of these properties other than the property or properties that the reference tone mapping strength data 134 depends on, or on the same property or properties upon which the reference tone mapping strength data 134 depends.

The pre-determined value may be, for example, a value that a content creator or image supplier has determined is an optimal or desired tone mapping to obtain a desired output image for viewing. For example, the creator or supplier of the image may have ascertained that the image quality of the image is optimal in particular viewing conditions with a particular reference tone mapping strength parameter used as an input to the tone mapping operation. This may be determined for example by adjusting the tone mapping strength parameter to adjust the strength of the tone mapping applied to the image, analyzing the display quality of the output image after the application of the tone mapping operation, for example by eye or electronically, and storing the tone mapping strength parameter corresponding with the optimal display quality as part of the input image file as the reference tone mapping strength data representing the reference tone mapping strength parameter. The viewing conditions the reference tone mapping strength parameter is optimized for may be relatively dark viewing conditions. In such cases, the reference tone mapping strength parameter may be zero, for example such that the tone mapping operation does not alter the input image data, so that the output image and the input image are the same. In other cases, the reference tone mapping strength parameter may be non-zero. The reference tone mapping strength parameter typically depends on the content of the image. For example, where the image includes human skin, the reference tone mapping strength parameter may be non-zero as human skin has a limited brightness, and therefore may be enhanced by application of a tone mapping operation, for example to amplify detail in the skin.

The display property of the display device may be any property, characteristic or attribute that may affect the display quality of the output image. For example, the display property may be a luminance of the display device, e.g. a maximum brightness or intensity of light emitted from a backlight for illuminating pixels of the display device or a maximum pixel luminance, or a display device type. Typically, a different amount of tone mapping is required for different types of display device, for example liquid crystal display devices (LCDs) compared with organic light emitting diode display devices (OLEDs), to achieve a given display quality of an output image, for example with a given amount of detail visible in dark regions of the output image.

Where the reference tone mapping strength data 134 and/or the further reference tone mapping strength data 136 depend on the ambient light level, the ambient light level can be measured for example by an ambient light sensor. The ambient light sensor may be coupled to or integral with the computing device. Such an ambient light sensor may include one or more photodetectors; the use of multiple photodetectors may increase the reliability of the measurement of diffuse ambient light.

As explained above, in some cases the reference tone mapping strength data 134 and/or the further reference tone mapping strength data 136 depend on an application property of an application for use in displaying the output image based on the output image data. An application property is for example a property specified by the developer, manufacturer or designer of the application that is intended for use in displaying the output image, for example a browser or other application capable of displaying images. The application property may for example specify that images should be displayed with a particular tone mapping, for example where it is desired to give images displayed using the application a particular "look". For example, the application developers may wish to display hyper-realistic images, with a high dynamic range, or murky images, with little detail visible, with a low dynamic range.

In some cases, the reference tone mapping strength data 134 depends on properties inherent to the image itself. The reference tone mapping strength parameter represented by the reference tone mapping strength data 134 may therefore be a pre-determined value as described above. In such cases, the further reference tone mapping strength data 136 may depend on parameters or properties that are independent of the nature or content of the image. For example, the further tone mapping strength parameter represented by the further tone mapping strength data 136 may depend on the display property of the display device configured to display an output image based on the output image data as explained above.

The reference tone mapping strength data 134 and the further tone mapping strength data 136 may be combined in various ways, as the skilled person will appreciate. For example, the reference tone mapping strength parameter represented by the reference tone mapping strength data 134 may be or correspond with a particular, e.g. a pre-determined, gain G. The gain G may be expressed as:

$$G = \frac{D_{TM}}{D} \quad (1)$$

where D is the dynamic range of the input image data before the tone mapping operation and $D_{TM}$ is a pre-determined output dynamic range to be obtained after the tone mapping operation.

The input value α to the tone mapping operation may be derived from the gain G as follows:

$$\alpha = \frac{G - 1}{G_{max} - 1} \quad (2)$$

where G is the gain defined in (1), and $G_{max}$ is the maximum gain achievable with a maximum tone mapping strength.

Where the reference tone mapping strength data 134 and the further tone mapping strength data 136 are combined, both the reference tone mapping strength data 134 and the further tone mapping strength data 136 may correspond with different respective gain values. In such cases, the reference tone mapping strength data 134, denoted as a first gain $G_1$, and the further tone mapping strength data 136, denoted as a second gain $G_2$, may be multiplied together as follows to obtain a combined gain denoted as $G_C$:

$$G_C = G_1 * G_2 \quad (3)$$

Similarly, the reference tone mapping strength data 134 may be combined with more than one set of further tone mapping strength data 136 by multiplying the first gain $G_1$ with the respective gain corresponding with each of set of further tone mapping strength data 136.

The combined strength parameter $\alpha_C$ may then be calculated as:

$$\alpha_C = \frac{G_C - 1}{G_{max} - 1} \quad (4)$$

In such examples, the gain value corresponding with the reference tone mapping strength data 134 may depend on different parameters or properties than the gain value corresponding with the further tone mapping strength data 136, as described above.

As the skilled person will appreciate, other methods or algorithms may be used to combine the reference tone mapping strength data 134 and the further tone mapping strength data 136. For example where the reference tone mapping strength data 134 equals a tone mapping strength parameter $\alpha_1$ and the further tone mapping strength data 136 equals a different tone mapping strength parameter $\alpha_2$, the combined strength parameter $\alpha_C$ may be obtained by multiplying $\alpha_1$ and $\alpha_2$.

The reference tone mapping strength data 134 and the further tone mapping strength data 136 may be combined using software, hardware or a combination of software and hardware.

Although the example of FIG. 4 illustrates the input value 132 being derived by an input value derivation module 138, it is to be appreciated that in other examples the input value may be derived by other modules of the computing device. Alternatively, the input value derivation module may be a sub-module or part of another module of the computing device, such as the tone mapping module 128. In other examples in which the input value is equal to the reference tone mapping strength data, there may be no dedicated module to derive the input value from the reference tone mapping strength data. In such cases, the reference tone mapping strength data may be input directly to the tone mapping module 128 as the input value without further processing or manipulation.

The input value 132 derived from the reference tone mapping strength data 134 and the further tone mapping strength data 136 is input to the tone mapping module 128 along with the input image data 130 representing the image. The tone mapping module 128 applies a tone mapping operation to the input image data 130. In the example of FIG. 4, the input value 132 represents what may be considered to be a "strength" of the tone mapping transformation, which may take a value between 0 and 1, for example. The input value 132 represents an amount of spatially-variant tone mapping, for example an amount or magnitude by which each pixel's intensity or brightness is altered by the tone mapping operation. The input value 132 itself may be different for different pixels in the image, in order to achieve an amount of tone mapping which varies across the image. For example, the input value 132 may vary in accordance with pixel intensity so that the tone mapping is stronger (for example with a higher input value 132) in darker parts of the image with low pixel intensity values, and is weaker in brighter parts of the image. This allows stronger enhancement of the shadows without affecting the bright regions. For example, a pixel-by-pixel gain may be calculated, for example by dividing the pixel intensity with maximum, or at least relatively strong, tone mapping applied by the pixel intensity with zero, or at least relatively low, tone mapping for each pixel. The pixel-by-pixel gain may be used as the input value 132 to the tone mapping module 128 and may be applied to the input image data 130 by multiplying the pixel intensity value of each pixel with the corresponding gain value for that pixel. In this example, the tone mapping operation is the ORMIT algorithm, and the input value 132 is the ORMIT α parameter.

The tone mapping operation applied by the tone mapping module 128 generates output image data 140 with the amount of spatially-variant tone mapping applied. An output image based on the output image data 140 may be displayed by the display device coupled to the computing device (described above, but not illustrated in FIG. 4).

Figure 5:
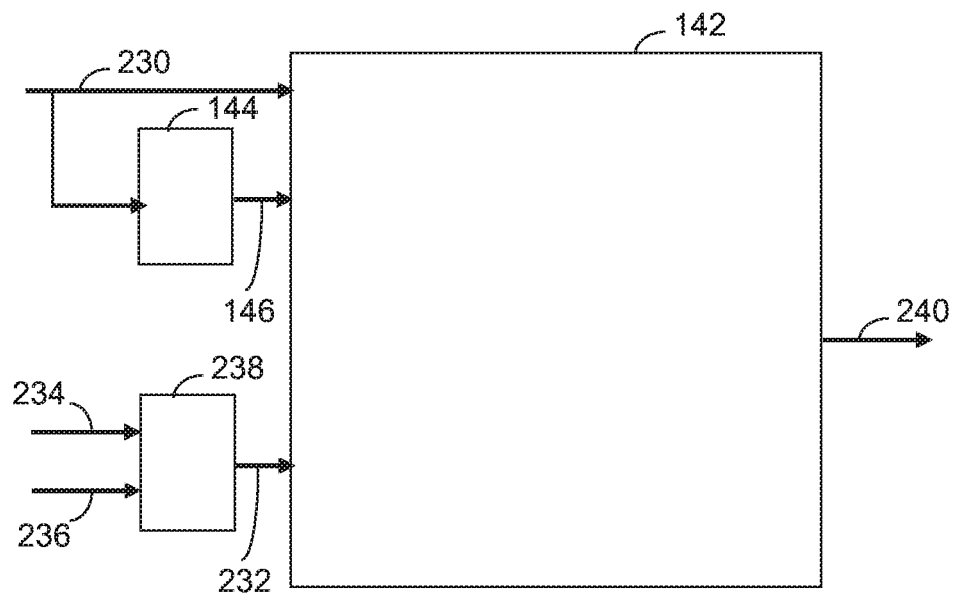
FIG. 5 is a schematic diagram showing a tone mapping module according to a further example.

FIG. 5 illustrates schematically a further example of a tone mapping module 142 for use in carrying out the method according to examples. Features of the tone mapping module 142 of FIG. 5 similar to the tone mapping module 128 of FIG. 4 are labelled with the same reference number but incremented by 100; corresponding descriptions should be taken to apply.

The tone mapping module 142 of FIG. 5 receives input image data 230 representing an image and an input value 232 representing an amount of spatially-variant tone mapping. The input value 232 has been derived by an input value derivation module 238 from the reference tone mapping strength data 234 and the further reference tone mapping strength data 236 similarly to the derivation of the input value 132 in the example of FIG. 4.

In the example of FIG. 5, the tone mapping module 142 is arranged to tone map the input image data using a method sometimes referred to as alpha-blending. In this example, the amount of spatially-variant tone mapping is a final amount of spatially-variant tone mapping and the input image data 230 is first input image data.

The example of FIG. 5 includes an initial tone mapping module 144, which is configured to apply an initial amount of spatially-variant tone mapping to the first input image data 230 to generate second input image data 146. The initial tone mapping module 144 is for example arranged to apply a non-zero, for example a maximal, amount of spatially-variant tone mapping to the first input image data 230. The ORMIT algorithm, described above, may be used by the initial tone mapping module 144. Although the initial tone mapping module 144 is illustrated as a separate module in FIG. 5, in other examples, the initial tone mapping module 144 may be integrated with the tone mapping module 142 or the tone mapping module 142 may be used to apply the initial amount of spatially-variant tone mapping to the first input image data 230.

The first input image data 230 and the second input image data 146 are input to the tone mapping operation implemented, in this example, by the tone mapping module 142. In the example of FIG. 5, the tone mapping operation includes generating the output image data 240 with the final amount of spatially-variant tone mapping based on the first input image data 230 and the second input image data 146. A relative contribution of the first input image data 230 and the second input image data 146 to the output image data 240 depends on the input value 232.

In this example, the input value 232 may also be calculated as the combined strength parameter $\alpha_C$ as described above. In this case, the pixel intensity values may be modified as:

$$I_{out} = I_1 * (1-\alpha_C) + I_2 * \alpha_C \qquad (5)$$

where $I_{out}$ is the output intensity value for the output image data, $I_1$ is the pixel intensity value from the first input image data 230 and $I_2$ is the pixel intensity value from the second input image data 146 obtained by applying the initial amount of spatially-variant tone mapping to the first input image data 230. In this case, as can be seen from equation (5), the relative contribution of the first input image data 230 and the second input image data 146 depends on the combined strength parameter $\alpha_C$, which is the input value 232 to the tone mapping operation in this example.

Other blending schemes are also possible. For example, the pixel intensity values may instead be modified as:

$$I_{out} = \sqrt{I_1^{2}*(1-\alpha_C) + I_2^{2}*\alpha_C} \qquad (6)$$

where $I_{out}$, $I_1$, $I_2$ and $\alpha_C$ are as previously defined.

The alpha-blending procedure may be considered to be an overlaying or combining of two versions of the same image; one with no tone mapping applied (corresponding to the first input image data 230) and one with non-zero tone mapping applied (corresponding to the second input image data 146), which may be with maximal tone mapping applied, for example. In further examples, the first input image data 230 may also be tone mapped compared with the input image data, but with a different amount of tone mapping than the initial amount of spatially-variant tone mapping applied to generate the second input image data 146.

The output of the alpha-blending process in the example of FIG. 5 is output image data 240 with the final amount of spatially variant tone mapping. As for FIG. 4, an output image based on the output image data 240 may be displayed on a display device coupled to the computing device.

Figure 6:
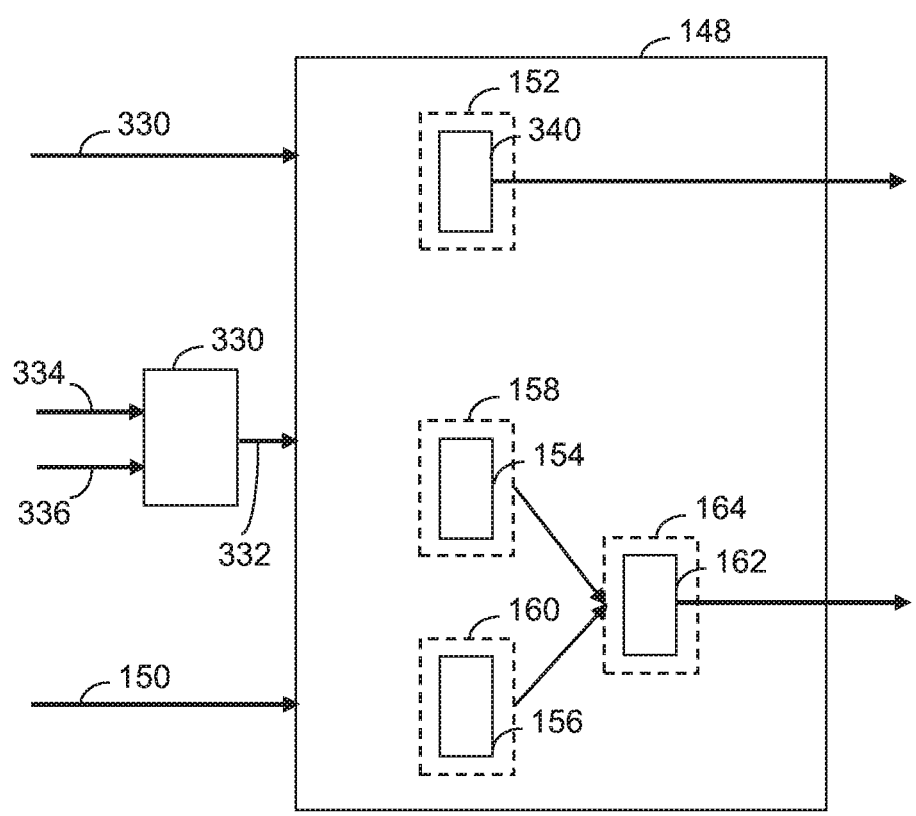
FIG. 6 is a schematic diagram showing a tone mapping module according to a yet further example.

FIG. 6 illustrates schematically a yet further example of a tone mapping module 148 for use in carrying out the method according to examples. Features of the tone mapping module 148 of FIG. 6 similar to the tone mapping module 128 of FIG. 4 are labelled with the same reference number but incremented by 100; corresponding descriptions should be taken to apply.

In the example of FIG. 6, the tone mapping module 148 receives input image data 330 representing an image and an input value 332 representing an amount of spatially-variant tone mapping. The input value 332 has been derived by an input value derivation module 338 from the reference tone mapping strength data 334 and the further reference tone mapping strength data 336 similarly to the derivation of the input value 132 in the example of FIG. 4. In FIG. 6, the tone mapping module 148 also receives variation data 150 indicating that the input value 332 is to vary.

The variation data 150 is for example received from an application, such as a browser, for displaying an output image based on the input image file. For example, a user may interact with content of the browser to indicate an intention to vary the tone mapping of the output image, for example by selecting a particular option from a menu or by interacting with an interactive component displayed by the browser or other application. For example, the browser may display a slider, which the user can slide, either using a touchscreen or a mouse or other input device to the computing device 100, to adjust the tone mapping of the output image. When the user contacts or selects the slider, this may be taken as an indication that the input value 332 is to vary and sent to the tone mapping module 148 as the variation data 150.

The tone mapping module 148 applies a tone mapping operation to generate output image data 340. The tone mapping operation applied by the tone mapping module 148 of FIG. 5 may be the tone mapping operation described with reference to FIG. 4 or 5, for example, or a different tone mapping operation. The output image data 340 is stored in an output frame buffer 152. The storing of the output image data 340 in the output frame buffer 152 is illustrated as being performed by the tone mapping module 148 in the example of FIG. 6. However, in other examples, the output image data 340 may be stored in the output frame buffer 152 using other modules or components of or coupled to the computing device 100.

In the example of FIG. 6, the tone mapping module 148 also generates first input image data 154 representing the image with a first amount of spatially-variant tone mapping applied and second input image data 156 representing the image with a second amount of spatially-variant tone mapping applied. The first input image data 154 is stored in a first frame buffer 158 and the second input image data 156 is stored in a second frame buffer 160. The first amount of spatially-variant tone mapping is, for example, zero and the second amount of spatially-variant tone mapping is, for example, non-zero, and may be a maximal amount of tone mapping.

By storing the first input image data 154 in a first frame buffer 158 and the second input image data 156 in a second frame buffer 160, the tone mapping module 148 is ready to apply various different amounts of alpha-blending of the first input image data 154 and the second input image data 156. This can allow for rapid changing of the tone mapping applied to the image, for example based on a user input.

For example, the tone mapping module 148 may receive, for each of at least one additional frame for display by a display device, a respective additional input value. The additional input value may be received via an application for display the output image, such as a browser, as described above for receiving the variation data 150. For example, the additional input value may be taken to correspond to the position of a slider on a display device coupled to the computing device 100. In this way, the user may vary the tone mapping applied in each of the at least one additional frame by altering the position of the slider.

The tone mapping module 148 may further be arranged to generate, for each of the at least one additional frame, an additional frame buffer storing additional output image data representing an additional output image based on the first input image data and the second input image data, a relative contribution of the first input image data and the second input image data to the additional output image data depending on the additional input value for the respective frame. FIG. 6 shows such an example: in FIG. 6, the first input image data 154 and the second input image data 156 are alpha-blended for each frame in dependence on the additional input value to generate the additional output image data 162, which is stored in the additional frame buffer 164.

In examples such as that of FIG. 6, an output image based on the output image data 230 may therefore be displayed in a first frame. In each of the at least one additional frame, the respective additional output image is displayed. In such cases, the at least one additional frame are, for example, subsequent to the first frame.

This method for example allows each of the at least additional frame to be associated with a different amount of alpha-blending of the first input image data 154 and the second input image data 156, allowing the tone mapping of the output image to be rapidly varied. For example, there is no need to re-retrieve the image data nor to recalculate or redo the tone mapping operation for each frame. Instead, it is merely necessary to recalculate the pixel intensities for the output image based on the input value, for example by changing the relative contribution of the first input image data 154 and the second input image data 156 to the additional output image data 162. This can be performed rapidly, for example by a graphics processing unit of the computing device 100.

Figure 7:
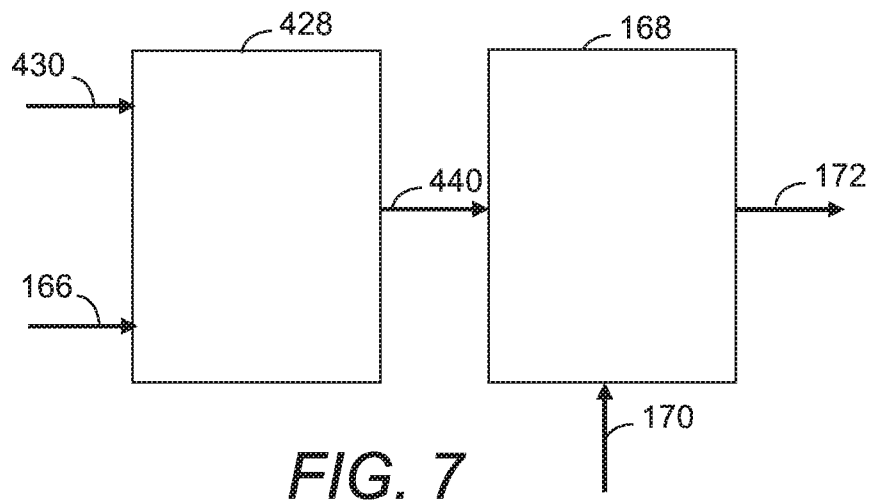
FIG. 7 is a schematic diagram showing an example including two tone mapping operations.

FIG. 7 is a schematic diagram showing an example including two tone mapping operations. In FIG. 7, input image data 430 representing an image is received by a tone mapping module 428. The input image data 430 and the tone mapping module 428 are similar to the input image data 130 and the tone mapping module 130 of FIG. 4; corresponding descriptions should be taken to apply.

The tone mapping module 428 also receives an input value 166 representing an amount of spatially-variant tone mapping. The input value 166 in this example is derived from, and in this case is equal to, reference tone mapping strength data representing a reference tone mapping strength parameter. A tone mapping operation is applied by the tone mapping module 428 to generate the output image data 440, which is similar to the output image data 140 of FIG. 4. However, in the example of FIG. 7, the output image data 440 is input to a further tone mapping operation, which in this example is implemented by a further tone mapping module 168. The further tone mapping module 168 also receives, as an input, further tone mapping strength data 170 representing a further tone mapping strength parameter for deriving a further input value representing a further amount of spatially-variant tone mapping. In this example, the further input value is equal to the further tone mapping strength parameter, although in other examples the further tone mapping strength parameter may be processed, on its own or with additional data, to derive the further input value.

The further tone mapping module 168 may be similar to the tone mapping module 428 and applies a further tone mapping operation to the output image data 440 to generate further output image data 172 representing a further output image with the further amount of spatially-variant tone mapping applied. In examples, the tone mapping module 428 and the further tone mapping module 168 may apply different tone mappings of different strengths, for example based on or depending on different properties or parameters. The tone mapping module 428 and the further tone mapping module 168 may be implemented in different, separate modules or they may be integrated in one module performing both functions.

An overview of examples of internal components for the computing device 100 of FIG. 2, which for example may include the tone mapping modules 128, 142, 148, 428, 168 of FIGS. 4 to 7, is provided below with reference to FIG. 8.

Figure 8:
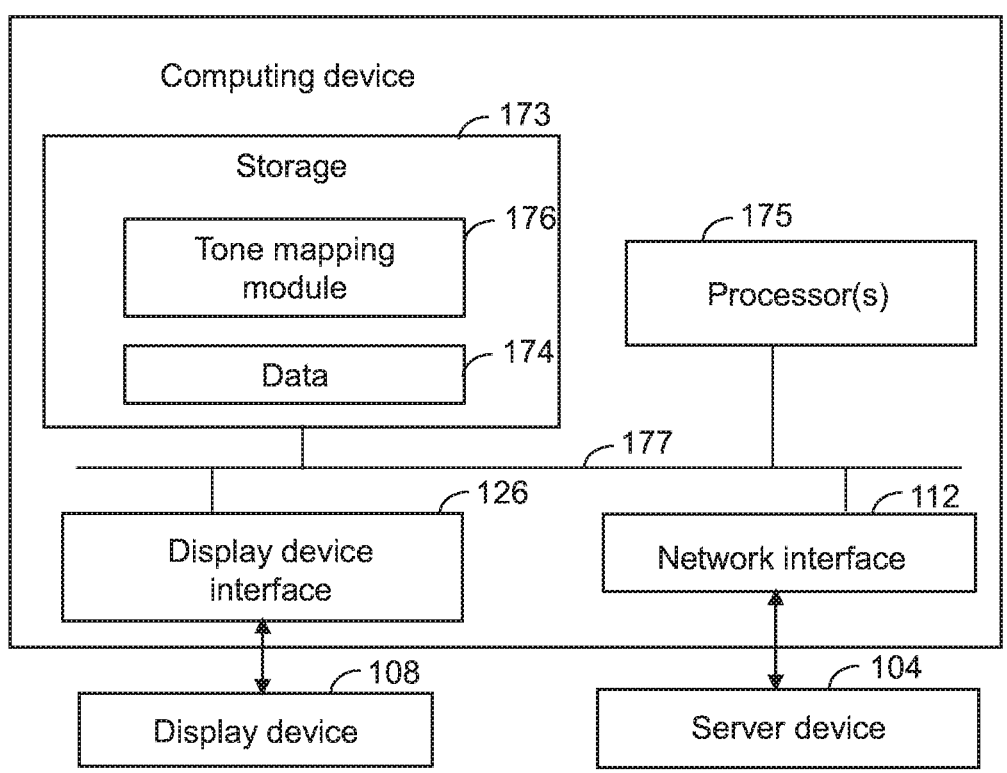
FIG. 8 is a schematic diagram showing an example of internal components of a computing device.

The computing device 100 of FIG. 8 comprises a network interface 112 to retrieve at least part of an input image file from the server device 104. The network interface 112 of the computing device 100 may comprise software and/or hardware components, such as a virtual network interface, an Ethernet port, a software driver and/or communications stack interacting with network hardware.

Storage 173 of the computing device 100 in the example of FIG. 8 stores data 174 received at the network interface 112. The data 174 in this example includes the at least part of an input image file, the at least part of the input image file including the input image data representing the image and the reference tone mapping strength data. The storage 173 may include at least one of volatile memory, such as a Random Access Memory (RAM) and non-volatile memory, such as Read Only Memory (ROM) or a solid state drive (SSD) such as Flash memory. The storage 173 in examples may comprise further storage devices, for example magnetic, optical or tape media, compact disc (CD), digital versatile disc (DVD) or other data storage media. The storage 173 may be removable or non-removable from the computing device 100.

At least one processor 175 is communicatively coupled to the storage 173 in the computing device 100 of FIG. 8. The at least one processor 175 in the example of FIG. 8 may be a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 178 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may comprise a thin terminal with graphics processing capabilities; in other cases the computing device may comprise a computing device comprising at least one central processing unit (CPU) and at least one graphics processing unit.

The storage 173 in the example of FIG. 8 includes computer program instructions configured to, when processed by the at least one processor 175, implement a tone mapping module 176 such as those described above with reference to FIGS. 4 to 7. The computer program instructions may be stored in an accessible non-transitory computer-readable medium and loaded into memory, for example the storage 173, to implement the tone mapping module 176. In examples, the storage 173 and the computer program instructions are configured to, with a graphics processing unit of the storage 173, implement the tone mapping module. For example, use of the graphics processing unit may allow for parallel processing of multiple operations for the tone mapping, improving the speed at which the data is tone mapped.

The components of the computing device 100 in the example of FIG. 8 are interconnected using a systems bus 177. This allows data to be transferred between the various components. For example, the output image data generated by the method according to examples can be stored in the storage 173 and subsequently transmitted via the systems bus 177 from the storage 173 to a display device interface 126 for transfer to the display device 108 for display. The display device interface 126 may include a display port and/or an internal electronics interface, e.g. where the display device 108 is part of the computing device 100 such as a display screen of a smart phone. Therefore, when instructed by the at least one processor 175 via the display device interface 126, the display device 108 will display an image based on the output image data.

As noted above, the input image file in examples is in the JPEG or JPEG XT file format. In such examples, the at least part of the input image file may be at least part of a decoded JPEG or JPEG XT file, or the method may include decoding the input image file or the at least part of the input image file. The decoding in examples, such as that of FIGS. 9 and 10 described below, may include additional processing of the input image data of the at least part of the input image file. Such processing may, for example, enhance an image quality of the image represented by the input image data.

Figure 9:
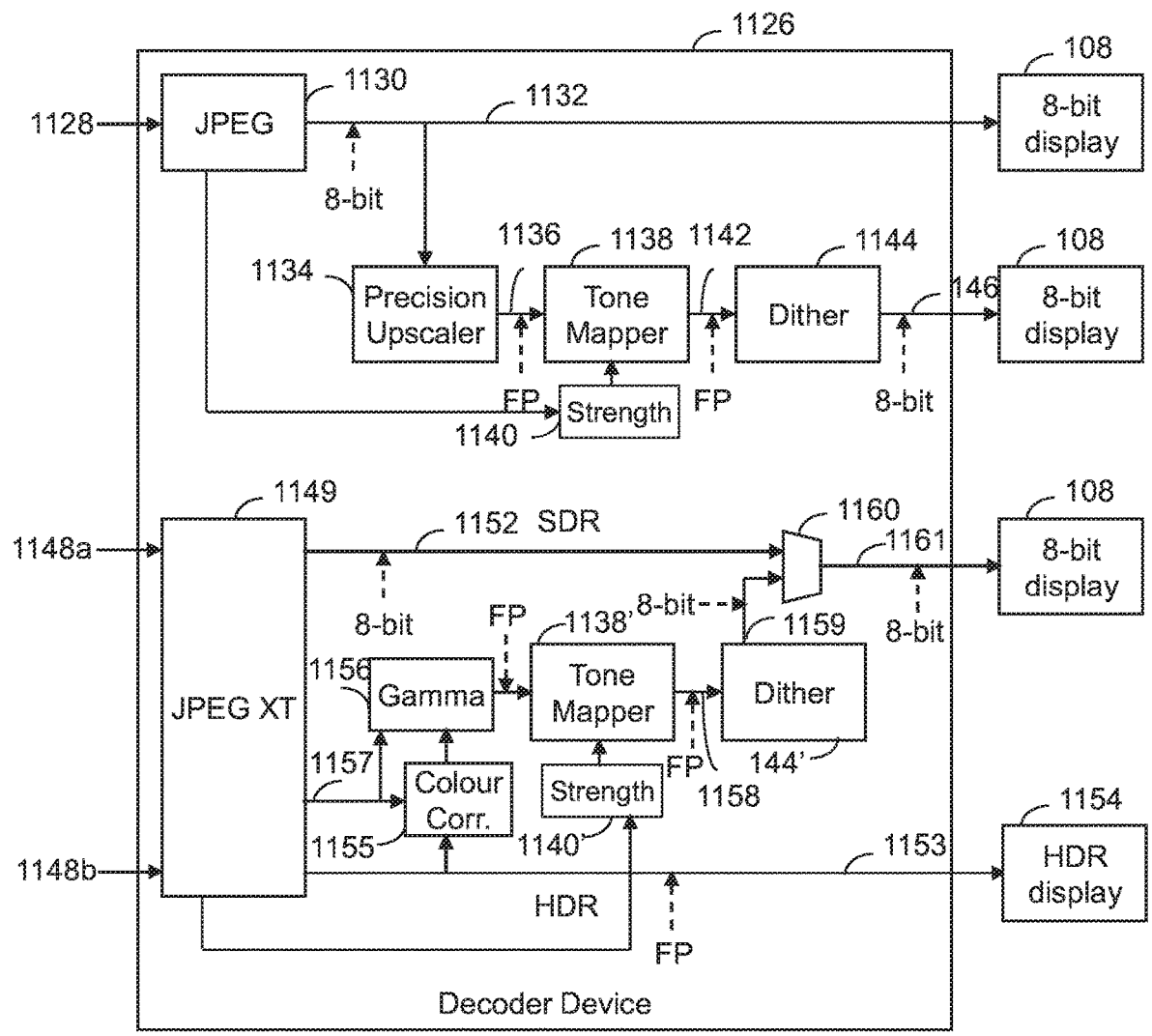
FIG. 9 is a schematic diagram showing an example of internal components of a decoder according to examples.

FIG. 9 shows schematically an example of internal components of a decoder 1126, which can be used with the method according to examples described herein. The decoder 1126 of FIG. 9 is suitable for decoding both 8-bit JPEG and more than 8-bit JPEG XT files, although other decoders may be used to carry out the method of examples that are solely arranged to decode one file type. Decoding of encoded image data in the 8-bit JPEG format will first be described, before decoding of encoded image data in the more than 8-bit JPEG XT format is described.

FIG. 9 shows schematically an example of the decoder 1126 receiving at least part of a JPEG input image file 1179 in the 8-bit JPEG format. The at least part of the JPEG input image file includes JPEG encoded image data representing the image. The JPEG encoded image data in this example has been encoded using a standard JPEG encoder, as the skilled person will appreciate. The decoder 1126 includes a standard JPEG decoder 1130, which receives and decodes the JPEG encoded input image data to generate JPEG first decoded image data 1132 with a first bit precision. A bit precision in examples is a number of bits associated with a piece of data. For example, a bit precision may also be referred to as a bit depth and may be the number of bits used to indicate an intensity value or a color or intensity value of a color channel of a pixel of an image. For example, for 8-bit JPEG first decoded image data, each color channel may be represented by an intensity value of between 0 and 255, giving 256 possible intensity values per color channel. There may be for example 3 color channels, for example a red, green or blue channel, although different numbers or types of color channel are also possible.

In this example, the first bit precision is 8-bit, which is the standard bit precision for JPEG files of the JPEG ISO/IEC 10918 standard, although other bit precisions are possible for the first bit precision, for example for other data types. For example, data with the first bit precision may be considered to be LDR or SDR data. The JPEG first decoded image data 1132 may be transferred for display on the display device 108 without further processing, to provide additional display flexibility. However, without further processing, the image quality will be limited to the image quality associated with a standard decoded JPEG file.

Thus, in the example of FIG. 9, the decoder 1126 not only decodes the JPEG encoded image data but also provides further image processing to enhance an image quality of the image represented by the JPEG encoded image data. The decoder 1126 in the example of FIG. 9 includes a "compression-noise" reduction module, which in this example is a precision upscaler 1134. The compression-noise reduction module in this example receives the JPEG first decoded image data 1132 and applies one or more compression-noise reduction filters to the JPEG first decoded image data 1132. In examples, application of the one or more compression-noise reduction filters reduces compression-noise in the JPEG first decoded image data 1132. Without reduction of compression-noise, there may be visible artifacts in the final image. Compression-noise typically occurs with a lossy encoding of original image data, such as JPEG or JPEG XT encoding. Lossy encoding generally involves an approximation of the original image data, with some reduction in image fidelity. For example, some original image information may be lost. It may not be possible to recover this lost information, which can reduce the image quality compared with the image quality of the original image. The compressed image data may, however, have a smaller file size than the original, uncompressed, image data representing the image, reducing the space requirements for storage of the compressed image data. Due to the approximation process involved in the lossy encoding algorithm, the representation of the image associated with decoded image data may suffer from compression artifacts such as compression-noise that are visible to an observer. For example, there may be noise, such as pixels with an incorrect (for example noticeably darker or lighter) intensity, around features of the image such as edges or regions corresponding to a transition from a light to a dark image region. There may also or instead be visible "blocks" of pixels with the same intensity around such image features, rather than pixels with smoothly varying intensities. Compression artifacts such as these are typically caused by the quantization step of the JPEG algorithm, which involves rounding of various components to integer values, thereby reducing the information associated with the quantized, encoded image data. The visibility of such compression artifacts may depend on the extent or amount of compression applied to the original image data to obtain the compressed image data.

Various different compression-noise reduction filters may be applied to the JPEG first decoded image data 1132 to generate JPEG second decoded image data 1136. For example, the JPEG first decoded image data 1132 may be in the form of a matrix or other multi-dimensional data structure. The JPEG first decoded image data 1132 may be convolved with a suitable "compression-noise" reduction filter, which is typically also in the form of a matrix or multi-dimensional data structure. The compression-noise reduction filter in examples smooths out compression artifacts in the JPEG first decoded image data 1132 while increasing the bit precision of the data from the first bit precision to the second bit precision, for example by converting the data from LDR or SDR data to HDR data. The compression-noise reduction filter may be used to reduce compression artifacts such as blockiness, e.g. visible blocks, or ringing, e.g. visible rings, in images. For example, a compression-noise reduction filter may be or include an edge detection filter such as a Canny edge detector, which may be applied to the JPEG first decoded image data 1132 to identify points or regions in the image at which the image brightness or pixel intensity changes rapidly or sharply. Such points or regions typically correspond with edges in the image, for example transitions between different surfaces or components within the image. Depending on the proximity to the identified edge regions, the pixel intensity values can be adjusted, for example smoothed, to reduce compression-noise in the image represented by the JPEG second decoded image data 1136. For example, pixel intensities may be averaged over a set of adjacent or nearby pixels for pixels in regions that are identified as being within a pre-determined proximity to a detected edge. In examples, the pixel intensity values may be altered by applying a further compression-noise reduction filter to the JPEG first decoded image data 1132, for example in regions of the image represented by the JPEG first decoded image data 1132 that are identified as corresponding to regions that are considered likely to suffer from compression artifacts. The application of the one or more compression-noise reduction filters in examples increases the bit precision of the data representing the image to the second bit precision, which is higher than the first bit precision of the first decoded image data. For example, data with the second bit precision may be HDR data, for example data with a bit precision higher than 8-bit. The one or more compression-noise reduction filters may be applied using a graphics processing unit of the computing device 100 (not illustrated) in examples. This can allow parallel processing or computation of convolutions of the one or more compression-noise reduction filters with various groups or regions of pixels of an image. This can improve the speed of performing the compression-noise reduction.

In examples, the application of the one or more compression-noise reduction filters includes applying one or more smoothing filters to reduce banding noise in the first decoded image data. Banding noise is a type of compression-noise that, as described above, may be caused by the quantization step of the JPEG or JPEG XT encoding algorithm. For example, during this quantization process, there may be a few image regions in an image in which pixel intensities change by a relatively small amount. For example, in an image of the sky with a lighter region and a darker region, the lighter region and the darker region may each show relatively little change in pixel intensity and/or color. In this illustrative example, the pixels corresponding to the lighter region in the image may be compressed to a first pixel intensity and color value, and the pixels corresponding to the darker region in the image may be compressed to a second pixel intensity and color value. This compression is typically not visible when no further processing is applied to the image. However, when a tone mapping operation is applied to the image, as in the method according to examples, the tone mapping operation may increase the difference between the lighter region and the darker region, leading to a visible band or contour in which all the pixels of the lighter region have the same pixel intensity and color value, which contrasts strongly with a neighboring band or contour of pixels of the darker region. By applying the one or more smoothing filters such as a low-pass filter with a suitable kernel, which for example governs how a pixel's filtered intensity value depends on the intensity value of neighboring pixels, the banding noise can be reduced. For example, the one or smoothing filters may reduce a sharpness in contrast between image regions of different intensities or colors, for example by blurring, spreading or gradually adjusting the pixel intensity in a transition region between the different image regions. For example, a simple low-pass filter can be used to calculate the average intensity of a pixel and the 8 immediate neighbors of the pixel, and replacing the original intensity value of the pixel with this calculated average intensity value. This can be used to increase the bit precision to the second bit precision, as for example the pixel intensity may be represented by a larger number of bits (for example, a larger or more finely quantized series of possible intensity values for the pixel intensity).

The extent to which the compression-noise in the image is reduced by the one or more compression-noise reduction filters may depend on a quality factor. For example, the quality factor may be received as an input to the one or more compression-noise reduction filters, for example to the precision upscaler 1134 in the example of FIG. 9. The quality factor may be selected by a user depending on a desired visual impression for the image or the quality factor may depend on user-independent characteristics such as the content of the image or settings associated with the image, for example provided by the content creator.

In examples, the JPEG decoder 1130 and the compression-noise reduction module are together considered to form a bit precision enlargement module. In other examples, though, the JPEG decoder and the compression-noise reduction module may be implemented separately or in distinct modules.

The output of the compression-noise reduction module is the JPEG second decoded image data 1136 with the second bit precision. The second bit precision need not be a fixed or constant bit precision. For example, in FIG. 9, the JPEG second decoded image data 1136 may be floating point data, for example stored in a floating-point representation with a higher available bit precision than the first bit precision. In other examples, the second bit precision may be fixed or constant, for example a fixed value of any one of 9 to 16. The JPEG second decoded image data 1136 is input to a tone mapping module 1138 which is configured to apply the tone mapping operation to the second decoded image data 1136 to generate first tone mapped image data 1142 with the second bit precision. The tone mapping module 1138 may be a tone mapping module similar to or the same as the tone mapping modules 128, 142, 148, 428, 168 of FIGS. 4 to 7.

The at least part of the JPEG input image file 1128 also includes reference tone mapping strength data representing a reference tone mapping strength parameter in the example of FIG. 9. In this example, the reference tone mapping strength data is used to derive an input value 1140, which is labelled as a "Strength" in this example. As described above, the input value 1140 represents the amount of spatially-variant tone mapping applied by the tone mapping module 1138, and is input to the tone mapping module 1138.

In FIG. 9, the input value 1140 is shown as being derived from the at least part of the JPEG input image file 1128 without decoding. However, in other examples, the reference tone mapping strength data of the at least part of the JPEG input image file 1128 may be decoded to generate decoded reference tone mapping strength data, and the input value 1140 may be derived from the decoded reference tone mapping strength data. For example, the reference tone mapping strength data may be decoded using the JPEG decoder 1130 or using a further decoder, which may be a separate module or part of the decoder 1126. Alternatively, the reference tone mapping strength data may have been decoded before receipt of the at least part of the JPEG input image file 1128 by the decoder 1126.

In the example of FIG. 9, the tone mapping operation is performed by the decoder 1126, which is capable of decoding input image data encoded at the first bit precision and of decoding input image data encoded at the second bit precision. In this example, the decoder 1126 comprises the bit precision enlargement module (which in this example includes the JPEG decoder 1130 and the precision upscaler 1134), the tone mapping module 1138 and the bit precision reduction module (to be described). In other examples, some or all of these modules may not form part of the decoder.

The JPEG first tone mapped image data 1142 in examples corresponds with the output image data described above, which represents an output image with the amount of spatially-variant tone mapping applied. Further processing may be applied to the JPEG first tone mapped image data 1142 to generate further output image data, based on the output image data, for display by the display device 108 coupled to the computing device 100. For example, a further tone mapping operation may be applied to the JPEG first tone mapped image data 1142 as described with reference to FIG. 7. FIG. 9, however, shows a different example of further processing. In the example of FIG. 9, the JPEG first tone mapped image data 1142 output from the tone mapping module 1138 is converted to JPEG second tone mapped image data 1146 with the first bit precision using a bit precision reduction module, which in this case is a dither module 1144. In examples, the bit precision reduction module reduces a bit precision of the JPEG first tone mapped image data 1142 to generate the JPEG second tone mapped image data 1146 while substantially maintaining an image quality of the image represented by the JPEG second tone mapped image data 1146. For example, the bit precision reduction module may be used to approximate the image quality of the image in the JPEG second tone mapped image data 1146, while also achieving the desired reduction in bit precision.

In examples, the second bit precision is represented by a first series of bits providing the first bit precision and an additional one or more bits providing additional bit precision to form the second bit precision. In such cases, the method may include, when converting the first tone mapped image data to the second tone mapped image data, improving the display quality of the image when represented by the first series of bits by deriving information from the additional one or more bits for pixels in at least part of the image and using the information to alter the first series of bits for pixels in the at least part of the image. The additional one or more bits for the pixels in the at least part of the image are discarded. In these cases, the additional one or more bits are used to manipulate or modify the first series of bits, but are not themselves part of the second tone mapped image data, which has the first bit precision.

In such examples, the improving the display quality of the image represented by the first series of bits may include applying a dithering operation to the first tone mapped image data. FIG. 9 shows such an example. The dithering operation may be used to approximate pixel intensities or other pixel values in the first tone mapped image data which can be represented with the second bit precision but not with the first bit precision in order to generate second tone mapped image data which still provides a relatively faithful and accurate representation of the image represented by the first tone mapped image data. For example, where a pixel intensity of a pixel region in the first tone mapped image data is at an intensity level not available with the second bit precision, the pixel intensity can be approximated with second tone mapped image data with some of the pixels in the pixel region at a lower intensity level and other pixels in the pixel region at a higher intensity level. The dithering operation is typically a spatial dithering operation, to avoid having to rapidly refresh the display as would be needed for a temporal dither. Various algorithms may be used by the dither module 1144 to apply the dithering operation, as the skilled person will appreciate. For example, an error diffusion dither operation may be applied by the dither module 1144. Error diffusion dithering can be used to reduce a bit precision of data. As a simple example, error diffusion dithering can be used to reduce an image to a binary image, in which each pixel is either black or white. For example, a halftoning process may be applied to pixels by assessing whether the intensity value of each pixel is above or below a threshold such as a mid-grey value for a black and white image and setting the pixel intensity to black if below the threshold and to white if above the threshold. The pixel intensity therefore differs from its original value. This difference may be considered to be an error, which can be added to one or more pixels in the image that haven't yet been compared to the threshold. This process can be repeated for all of the pixels in the image to generate the halftoned or dithered image. As will be appreciated, in other examples, error diffusion dither may be applied to produce output images with more than two intensity levels per pixel, for example to produce the second tone mapping image data with the first bit precision.

The first bit precision is for example equal to a maximum bit precision displayable by a display device configured to display an output image based on the second tone mapped image data. For example, for typical LDR display devices, the first bit precision may be 8-bit.

The second tone mapped image data 1146 is transferred for display by the display device 108 coupled to the computing device 100. Further processing may be applied to the second tone mapped image data 1146 before display, either at the decoder 1126 (not shown) or outside the decoder 1126, for example in another module of the computing device 100. For example, the second tone mapped image data 1146 may be composited with further display data representing at least one further display element to generate an output image for display by the display device 100. As the skilled person will appreciate, the compositing may be performed by a compositing window manager, which is also referred to as a compositor. A compositor in examples draws different applications in different windows and overlays the different windows appropriately, with varying degrees of transparency, in order to display a desired output image on the display device 100.

By using the decoder to both decode the encoded image data and to generate the second tone mapped image with the first bit precision, greater flexibility is provided for processing of the image. For example, the image may be processed by the decoder and then further processed by the display driving system, e.g. by the display controller. For example, further tone mapping, or dynamic range compression or expansion, may be applied to the data for display by the display device (including the image, and the remainder of the screen for display) by the display driving system, to further improve the image quality.

Moreover, processing of the first decoded image data to generate the second decoded image data boosts or increases a bit precision of the data representing the image. This allows the tone mapping operation to be applied to the second decoded image data with a higher bit precision representation of the image than otherwise. For example, the second decoded image data may store increased information about the image due to the increased bit precision, allowing the image to be reproduced more accurately, for example after subsequent processing steps. This improves the outcome of the tone mapping operation, leading to greater enhancement in detail in the image, while maintaining its natural look, than would otherwise be achieved if the tone mapping operation was applied to a representation of the image with a lower bit depth. Moreover, by converting the first tone mapped image data to the second tone mapped image data with the first bit precision, the image represented by the second tone mapped image data can be displayed by display devices with the first bit precision, but with improved display quality.

As noted above, the example decoder 1126 of FIG. 9 can also be used to decode JPEG XT compressed image data 1148 in a more than 8-bit JPEG XT format, as will now be described.

Figure 10:
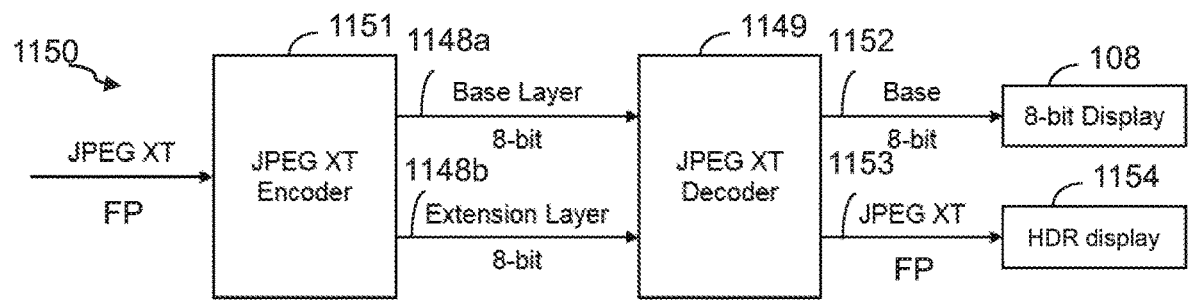
FIG. 10 is a schematic diagram showing an example JPEG XT codec.

At least part of a JPEG XT input image file 1148 is received by a JPEG XT decoder 1149 of the decoder 1126 of FIG. 9. The at least part of the JPEG XT input image file 1148 includes base image layer data 1148a and additional image layer data 1148b. The JPEG XT decoder 1149 of FIG. 9 is illustrated schematically in FIG. 10, which shows an example JPEG XT codec 1150 (coder-decoder). The JPEG XT codec 1150 receives input image data representing the image. In this example, the input image data has a floating point bit precision of more than 8 bits, although other bit precisions are possible in other examples, for example fixed or static bit precisions of more than 8 bits. The input image data is encoded using a JPEG XT encoder 1151, which encodes the data into a base image layer containing the base image layer data 1148a and an additional image layer containing the additional image layer data 1148b. The base image layer data 1148a may be LDR or SDR data accessible to legacy implementations so that the JPEG XT image can be decoded using a standard JPEG decoder, which can decode the LDR or SDR data and ignore the additional image layer data. The additional image layer data 1148b in examples includes residual image data and transformation information for reconstructing an HDR image, for example an image with a higher dynamic range than the image represented by the base image layer data 1148a. The base image layer data 1148a may therefore be considered to represent a first dynamic range representation of the image. A second dynamic range representation of the image, the second dynamic range being larger than the first dynamic range, may be generated using the additional image layer data 1148b. Both the base image layer data 1148a and the additional image layer data 1148b may have the same bit precision, for example 8-bit. FIG. 10 illustrates an example in which both the base image layer data 1148a and the additional image layer data 1148b are 8-bit, although in other examples, the base image layer data 1148a and the additional image layer data 1418b may have a different bit precision from each other and/or a different bit precision than 8-bit.

In the example of FIGS. 9 and 10, the base image layer data 1148a and the additional image layer data 1148b are input to the JPEG XT decoder 1149. The JPEG XT decoder 1149 of FIGS. 9 and 10 decodes the base image layer data 1148a to generate decoded base image layer data 1152. In this example, the base image layer data 1148a may be considered to correspond with encoded image data representing the image and the decoded base image layer data 1152 may be considered to correspond with first decoded image data with a first bit precision, which in this example is 8-bit, although other bit precisions are possible. The JPEG XT decoder 1149 also decodes the additional image layer data 1148b to generate decoded additional image layer data (not illustrated). In this example the decoded additional image layer data has the second bit precision, although in other examples the decoded additional image layer data may have a bit precision different from, for example larger or smaller than the second bit precision. Typically, however, the decoded additional image layer data has a bit precision larger than the first bit precision. The decoded base image layer data 1152 can then be manipulated based on the decoded additional image layer data to generate the JPEG XT second decoded image data 1153 with the second bit precision. The decoded additional image layer data can for example be used to apply various transformations to the decoded base image layer data 1152 to generate the JPEG XT second decoded image data 1153, as the skilled person will appreciate. In examples such as this, the processing the first decoded image data to generate the second decoded image data may include applying the decoded additional image layer data to the decoded base image layer data 1152 to generate the second decoded image data 1153. The second decoded image data 1153 may correspond with the second dynamic range representation of the image.

The second dynamic range representation of the image may have a higher bit depth than 8-bit, e.g. floating point with a bit precision higher than 8-bits or in a bit range of 9 to 16 bits, for example for display on an HDR display device 1154, for example a display device capable of displaying higher bit depth images. For example, the second decoded image data 1153 in the example of FIGS. 9 and 10 is HDR data. A JPEG XT decoder can also decode standard JPEG images as well as JPEG XT images by using solely the base image layer data, for example for display on an LDR or SDR display, such as the display device 108 described above, with an 8-bit display capability. For example, the base image layer data may be decoded and processed similarly to the processing of the JPEG first decoded image data to improve the image quality. Thus, for JPEG XT images, the decoder in examples provides two options for producing an output image for display an on LDR display: the output image can be obtained by processing of the base image layer data alone or by processing of the base image layer data and the additional image layer data.

In the example of FIGS. 9 and 10, prior to display of the JPEG XT image on the HDR display device 1154, further processing (not illustrated in FIG. 10, but shown in FIG. 9), is applied to the JPEG XT second decoded image data 1153. This processing is similar to the processing that the decoder 1126 is arranged to apply after JPEG decoding of the JPEG encoded image data, however it is not required to apply the one or more compression-noise reduction filters to generate the JPEG XT second decoded image data 1153 with the second bit precision, as the JPEG XT second decoded image data 1153 received from the JPEG XT decoder 1149 is already at the second bit precision.

Nevertheless, in some examples, one or more compression-noise reduction filters, such as those described above with reference to the processing of JPEG images, may be applied to the JPEG XT second decoded image data 1153. Such compression-noise reduction filters may be used to reduce compression artifacts that may be present in the image represented by the JPEG XT second decoded image data 1153. In these examples, the application of the one or more compression-noise reduction filters may increase the bit precision or may not alter the bit precision of the JPEG XT second decoded image data 1153. For example, it may be beneficial to apply one or more compression-noise reduction filters for images in which certain image regions, such as bright regions, are effectively represented with a relatively low bit precision such as 8-bit. This may be the case where there is non-negligible noise in these image regions. For example, in some images, the noise may be from a few bits to 8 bits. In these examples, as the dynamic range may be considered to correspond to the ratio between the brightest part of the image and the noise, for example the standard deviation, of the darkest part of the image, the effective dynamic range in certain image regions may therefore be noticeably reduced due to the amount of noise in these regions. In such examples, one or more compression-noise reduction filters can be applied to the image for example to improve the precision of these image regions.

In further examples, the one or more compression-noise reduction filters may be applied by the JPEG XT decoder itself such that the outputs of the JPEG XT decoder, e.g. the decoded base image layer data 1152 and the JPEG XT second decoded image data 1153, may be output with the compression-noise reduction already applied.

In this case, the JPEG XT second decoded image data 1153 is input to a color correction module 1155 and then, after color correction by the color correction module 1155, to a gamma correction module 1156. The color correction module 155 and the gamma correction module 1156 receive data 1157, in this example metadata, from the JPEG XT decoder 1149, which governs the extent of color correction and gamma correction applied by the color correction module 1155 and the gamma correction module 1156 respectively. In other examples, however, the color correction module 1155 and/or the gamma correction module 1156 may not receive data from the JPEG XT decoder 1149. In these examples, the extent of correction applied by the color correction module 1155 and the gamma correction module 1156 may be pre-set or pre-determined. The color correction module 1155 may be used to modify or alter a color of the image, for example to widen a color gamut of the image e.g. to match or correspond with a wide color gamut of a display device for displaying the image. The gamma correction module 1156 may be used to apply a gamma correction operation to the image. Gamma correction is typically a non-linear operation that may be defined using the following power-law expression:

$$V_{out} = AV_{in}^{\gamma} \qquad (1)$$

where $V_{out}$ is an output value, A is a constant, $V_{in}$ is an input value and $\gamma$ is a gamma value. The input and output values are for example luminance or tristimulus values of pixels of the image. Gamma correction can be used for example to represent an image so that an adequate number of bits are allocated to image features that can be distinguished by the human eye, without allocating too many bits to represent image features that the human eye is unable to perceive. For example, gamma correction may be used to provide a representation of the image with a uniform error across the brightness range of the image. This can be used to reduce the appearance of compression artifacts in the image. In further examples, though, no color correction and/or gamma correction may be applied to the JPEG XT second decoded image data 1153. For example, the color correction module 1155 and the gamma correction module 1516 may be absent from the decoder.

After color correction and gamma correction the JPEG XT second decoded image data 1153, which in this example has a floating point bit precision of larger than 8 bits at this stage in the process, is provided to a tone mapping module 1138', which is similar to the tone mapping module 1138 described for tone mapping of JPEG data, and which applies an amount of tone mapping based on an input value 1140' similar to the input value 1140 described above, which in this example is denoted as a "Strength", similar to the input value 1140. JPEG XT first tone mapped image data 1158 with the second bit precision is generated by the tone mapping module 1138', and is input to the dither module 1144', which is similar to the dither module 1144 described above for dithering of JPEG data. The dither module 1144' converts the JPEG XT first tone mapped image data 1158 to JPEG XT second tone mapped image data 1159 with the first bit precision.

In the example of FIG. 9, the SDR data, which corresponds to the decoded base image layer data 1152 and the JPEG XT second tone mapping image data 1159 are received as inputs to a decision module 1160. The decision module 1160 in this example receives an input that indicates whether the standard SDR data is to be displayed on the display device 108 or whether the JPEG XT second tone mapping image data 1159 is to be displayed on the display device 108. In this way, the input to the decision module 1160 can be used to determine whether the image is to be displayed after application of the method of image processing (for example, with tone mapping and the other processes described herein) or whether a standard image without this image processing is to be displayed. The output 1161 of the decision module 1160 is displayed by the display device 108. In other examples, though, the decision module 1160 may be absent, in which case the JPEG XT second tone mapped image data 1159 may be transferred to the display device 108 for display and the decoded base image layer data 1152 may not be displayed.

In the example of FIG. 9, the HDR data (corresponding to the JPEG XT second decoded image data 1153) is shown as being displayed on an HDR display 1154. However, in other examples, the JPEG XT second decoded image data 1153 may not be displayed but may instead be discarded or stored for further processing of the image data if required.

The JPEG XT decoder of FIG. 9 therefore provides flexibility for displaying of images as well as backwards compatibility if required. For example, this JPEG XT decoder allows standard JPEG images (corresponding to the decoded base layer image data 1153) to be displayed on SDR display devices 108, tone mapped images (corresponding to the JPEG XT second tone mapped image data 1159) to be displayed on SDR display devices 108 and HDR images (corresponding to the JPEG XT second decoded image data 1153) to be displayed on HDR display devices 1154. For example, each of these options can be chosen as desired, for example depending on the display device available for display of the image, the nature or content of the image to be processed or a user preference.

The above examples are to be understood as illustrative examples. Further examples are envisaged. For example, the examples given above refer to use of images in the JPEG or JPEG XT file formats. However, it is to be appreciated that the method, systems and devices described above may be applied to or used with images stored in various other file formats.

In the above examples, the at least part of the input image file is received from a server device. However, in other examples, the at least part of the input image file may be stored on storage of the computing device. For example, the image may have been captured by an image capture device such as a camera of or coupled to the computing device or may have been downloaded or transferred to the computing device from other storage than storage of a server device, and stored as the input image file on storage of the computing device.

The examples described above use software to implement the method according to examples. However, in other examples, the method may be implemented using solely hardware or using a combination of hardware and software.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

Clause 1. A method comprising: receiving at least part of an input image file, the at least part of the input image file comprising: input image data representing an image; and reference tone mapping strength data representing a reference tone mapping strength parameter for deriving an input value representing an amount of spatially-variant tone mapping; inputting the input image data and the input value to a tone mapping operation; and applying the tone mapping operation to the input image data to generate output image data representing an output image with the amount of spatially-variant tone mapping applied.

Clause 2. The method of clause 1, comprising: receiving further tone mapping strength data representing a further tone mapping strength parameter; and deriving the input value, the deriving the input value comprising combining the reference tone mapping strength data and the further tone mapping strength data to generate combined tone mapping strength data, the input value being equal to the combined tone mapping strength data.

Clause 3. The method of clause 2, wherein the further tone mapping strength parameter depends on a display property of a display device configured to display an output image based on the output image data.

Clause 4. The method of clause 1, comprising: receiving further tone mapping strength data representing a further tone mapping strength parameter for deriving a further input value representing a further amount of spatially-variant tone mapping; inputting the output image data and the further input value to a further tone mapping operation; and applying the further tone mapping operation to the output image data to generate further output image data representing a further output image with the further amount of spatially-variant tone mapping applied.

Clause 5. The method of clause 1, wherein the input value is equal to the reference tone mapping strength parameter.

Clause 6. The method of any one of clauses 1 to 5, wherein the reference tone mapping strength parameter depends on at least one of: a pre-determined value; a display property of a display device configured to display an output image based on the output image data; an ambient light level; or an application property of an application for use in displaying the output image based on the output image data.

Clause 7. The method of any one of clauses 1 to 6, wherein the amount of spatially-variant tone mapping is a final amount of spatially-variant tone mapping and the input image data is first input image data, the method further comprising: applying an initial amount of spatially-variant tone mapping to the first input image data to generate second input image data; and inputting the second input image data to the tone mapping operation, the tone mapping operation comprising: generating the output image data with the final amount of spatially-variant tone mapping based on the first input image data and the second input image data, a relative contribution of the first input image data and the second input image data to the output image data depending on the input value.

Clause 8. The method of any one of clauses 1 to 7, comprising: receiving variation data indicating that the input value is to vary; storing the output image data in an output frame buffer; generating first input image data representing the image with a first amount of spatially-variant tone mapping applied; generating second input image data representing the image with a second amount of spatially-variant tone mapping applied; storing the first input image data in a first frame buffer; and storing the second input image data in a second frame buffer.

Clause 9. The method of clause 8, comprising: receiving, for each of at least one additional frame for display by a display device, a respective additional input value; and generating, for each of the at least one additional frame, an additional frame buffer storing additional output image data representing an additional output image based on the first input image data and the second input image data, a relative contribution of the first input image data and the second input image data to the additional output image data depending on the additional input value for the respective frame.

Clause 10. The method of clause 9, comprising displaying an output image based on the output image data in a first frame and, in each of the at least one additional frame, displaying the respective additional output image, the at least one additional frame subsequent to the first frame.

Clause 11. The method of any one of clauses 8 to 10, wherein the first amount of spatially-variant tone mapping is zero and the second amount of spatially-variant tone mapping is non-zero.

Clause 12. The method of any one of clauses 1 to 11, wherein the input image file is an 8-bit JPEG (Joint Photographic Experts Group) file or a more than 8-bit JPEG XT file.

Clause 13. The method of any one of clauses 1 to 12, wherein the reference tone mapping strength data is metadata associated with the input image data.

Clause 14. A computing device comprising: storage for storing at least part of an input image file, the at least part of the input image file comprising: input image data representing an image; and reference tone mapping strength data representing a reference tone mapping strength parameter for deriving an input value representing an amount of spatially-variant tone mapping; at least one processor communicatively coupled to the storage; and a tone mapping module configured to: receive the input image data and the input value; and apply the tone mapping operation to the input image data to generate output image data representing an output image with the amount of spatially-variant tone mapping applied.

Clause 15. The computing device of clause 14, wherein: the storage comprises computer program instructions; and the at least one processor comprises a graphics processing unit, the storage and the computer program instructions being configured to, with the graphics processing unit, implement the tone mapping module.

What is claimed is:

1. A method comprising:
receiving at least part of an input image file, the at least part of the input image file comprising:
input image data representing an image; and
reference tone mapping strength data representing a reference tone mapping strength parameter for deriving an input value representing an amount of spatially-variant tone mapping, wherein the reference tone-mapping strength parameter represents a reference amount of dynamic range adjustment associated with the image;
inputting the input image data and the input value to a tone mapping operation; and
applying the tone mapping operation to the input image data to generate output image data representing an output image with the amount of spatially-variant tone mapping applied.

2. The method of claim 1, comprising:
receiving further tone mapping strength data representing a further tone mapping strength parameter; and
deriving the input value, the deriving the input value comprising combining the reference tone mapping strength data and the further tone mapping strength data to generate combined tone mapping strength data, the input value being equal to the combined tone mapping strength data.

3. The method of claim 2, wherein the further tone mapping strength parameter depends on a display property of a display device configured to display an output image based on the output image data.

4. The method of claim 1, comprising:
receiving further tone mapping strength data representing a further tone mapping strength parameter for deriving a further input value representing a further amount of spatially-variant tone mapping;
inputting the output image data and the further input value to a further tone mapping operation; and
applying the further tone mapping operation to the output image data to generate further output image data representing a further output image with the further amount of spatially-variant tone mapping applied.

5. The method of claim 1, wherein the input value is equal to the reference tone mapping strength parameter.

6. The method of claim 1, wherein the reference tone mapping strength parameter depends on at least one of: a pre-determined value; a display property of a display device configured to display an output image based on the output image data; an ambient light level; or an application property of an application for use in displaying the output image based on the output image data.

7. The method of claim 1, wherein the amount of spatially-variant tone mapping is a final amount of spatially-variant tone mapping and the input image data is first input image data,
the method further comprising:
applying an initial amount of spatially-variant tone mapping to the first input image data to generate second input image data; and
inputting the second input image data to the tone mapping operation,
the tone mapping operation comprising:
generating the output image data with the final amount of spatially-variant tone mapping based on the first input image data and the second input image data, a relative contribution of the first input image data and the second input image data to the output image data depending on the input value.

8. The method of claim 1, comprising:
receiving variation data indicating that the input value is to vary;
storing the output image data in an output frame buffer;
generating first input image data representing the image with a first amount of spatially-variant tone mapping applied;
generating second input image data representing the image with a second amount of spatially-variant tone mapping applied;
storing the first input image data in a first frame buffer; and
storing the second input image data in a second frame buffer.

9. The method of claim 8, comprising:
receiving, for each of at least one additional frame for display by a display device, a respective additional input value; and
generating, for each of the at least one additional frame, an additional frame buffer storing additional output image data representing an additional output image based on the first input image data and the second input image data, a relative contribution of the first input image data and the second input image data to the additional output image data depending on the additional input value for the respective frame.

10. The method of claim 9, comprising displaying an output image based on the output image data in a first frame and, in each of the at least one additional frame, displaying the respective additional output image, the at least one additional frame subsequent to the first frame.

11. The method of claim 8, wherein the first amount of spatially-variant tone mapping is zero and the second amount of spatially-variant tone mapping is non-zero.

12. The method of claim 1, wherein the input image file is an 8-bit JPEG (Joint Photographic Experts Group) file or a more than 8-bit JPEG XT file.

13. The method of claim 1, wherein the reference tone mapping strength data is metadata associated with the input image data.

14. A computing device comprising:
storage for storing at least part of an input image file, the at least part of the input image file comprising:
input image data representing an image; and
reference tone mapping strength data representing a reference tone mapping strength parameter for deriving an input value representing an amount of spatially-variant tone mapping, wherein the reference tone-mapping strength parameter represents a reference amount of dynamic range adjustment associated with the image;
at least one processor communicatively coupled to the storage; and
a tone mapping module configured to:
receive the input image data and the input value; and
apply the tone mapping operation to the input image data to generate output image data representing an output image with the amount of spatially-variant tone mapping applied.

15. The computing device of claim 14, wherein:
the storage comprises computer program instructions; and
the at least one processor comprises a graphics processing unit,
the storage and the computer program instructions being configured to, with the graphics processing unit, implement the tone mapping module.

16. The computing device of claim 14, comprising an input value derivation module configured to:
receive further tone mapping strength data representing a further tone mapping strength parameter; and
derive the input value, the deriving the input value comprising combining the reference tone mapping strength data and the further tone mapping strength data to generate combined tone mapping strength data, the input value being equal to the combined tone mapping strength data.

17. The computing device of claim 14, wherein:
the amount of spatially-variant tone mapping is a final amount of spatially-variant tone mapping and the input image data is first input image data; and
the tone mapping module is configured to:
apply an initial amount of spatially-variant tone mapping to the first input image data to generate second input image data; and
input the second input image data to the tone mapping operation,
the tone mapping operation comprising:
generating the output image data with the final amount of spatially-variant tone mapping based on the first input image data and the second input image data, a relative contribution of the first input image data and the second input image data to the output image data depending on the input value.

18. The computing device of claim 14, wherein:
the storage comprises:
an output frame buffer for storing the output image data;
a first frame buffer for storing first input image data representing the image with a first amount of spatially-variant tone mapping applied; and
a second frame buffer for storing second input image data representing the image with a second amount of spatially-variant tone mapping applied; and
the tone mapping module is configured to:
receive variation data indicating that the input value is to vary;
generate the first input image data; and
generate the second input image data.

19. The computing device of claim 18, comprising a display device, wherein the tone mapping module is configured to:
receive, for each of at least one additional frame for display by the display device, a respective additional input value; and
generate, for each of the at least one additional frame, additional output image data representing an additional output image based on the first input image data and the second input image data, a relative contribution of the first input image data and the second input image data to the additional output image data depending on the additional input value for the respective frame.

20. The computing device of claim 19, wherein the at least one processor is configured to instruct the display device to display:
an output image based on the output image data in a first frame; and
in each of the at least one additional frame, the respective additional output image,
the at least one additional frame subsequent to the first frame.

* * * * *